(12) United States Patent
Takeda et al.

(10) Patent No.: US 11,218,995 B2
(45) Date of Patent: Jan. 4, 2022

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 35 days.

(21) Appl. No.: 16/635,425

(22) PCT Filed: Aug. 2, 2017

(86) PCT No.: PCT/JP2017/028114
§ 371 (c)(1),
(2) Date: Jan. 30, 2020

(87) PCT Pub. No.: WO2019/026215
PCT Pub. Date: Feb. 7, 2019

(65) Prior Publication Data
US 2021/0092717 A1 Mar. 25, 2021

(51) Int. Cl.
*H04W 72/04* (2009.01)
*H04W 92/10* (2009.01)

(52) U.S. Cl.
CPC ......... *H04W 72/04* (2013.01); *H04W 72/042* (2013.01); *H04W 72/0453* (2013.01); *H04W 92/10* (2013.01)

(58) Field of Classification Search
CPC .......... H04W 72/0453; H04W 72/042; H04W 92/10
See application file for complete search history.

(56) References Cited

U.S. PATENT DOCUMENTS

2019/0342944 A1* 11/2019 Chatterjee ........... H04W 72/044
2019/0356524 A1* 11/2019 Yi .......................... H04W 48/16
2020/0344034 A1* 10/2020 Moon ................... H04L 5/0094

(Continued)

OTHER PUBLICATIONS

Extended European Search Report issued in counterpart European Patent Application No. 17920400.3, dated Feb. 15, 2021 (9 pages).

(Continued)

*Primary Examiner* — Raj Jain
(74) *Attorney, Agent, or Firm* — Osha Bergman Watanabe & Burton LLP

(57) ABSTRACT

A terminal is disclosed including a receiver that receives at least one of first configuration information about a bandwidth part (BWP)-specific reserved resource and second configuration information about a cell-specific reserved resource; and a processor that controls receiving processes for Physical Downlink Shared Channel (PDSCH) under an assumption that the PDSCH is not allocated in a reserved resource corresponding to the at least one of the first configuration information and the second configuration information, wherein the reserved resource is at least one of following: a whole of a given BWP in a period; a part of the given BWP in the period; and not included in the given BWP in the period. In other aspects, a radio communication method for a terminal is also disclosed.

3 Claims, 13 Drawing Sheets

(56) References Cited

U.S. PATENT DOCUMENTS

2021/0092717 A1* 3/2021 Takeda .................. H04L 5/001

OTHER PUBLICATIONS

RAN WG1; "LS on Bandwidth Part operation in NR"; 3GPP TSG RAN WG2#99, R2-1707624; Berlin, Germany; Aug. 21-25, 2017 (3 pages).
Samsung; "DCI Contents for NR"; 3GPP TSG RAN WG1 Meeting #89, R1-1707995; Hangzhou, China; May 15-19, 2017 (5 pages).
Samsung; "Multiplexing NR-PDCCH and PDSCH"; 3GPP TSG RAN WG1 NR Ad-Hoc#2, R1-1710696; Qingdao, P.R. China; Jun. 27-30, 2017 (6 pages).
International Search Report issued in PCT/JP2017/028114 dated Oct. 17, 2017 (1 page).
Written Opinion of the International Searching Authority issued in PCT/JP2017/028114 dated Oct. 17, 2017 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in counterpart Korean Patent Application No. 10-2020-7003998, dated Jul. 9, 2021 (8 pages).
Samsung; "Indication of reserved resources"; 3GPP TSG RAN WG1 #89, R1-1709039; Hangzhou, China, May 15-19, 2017 (3 pages).
Samsung; "Flexible BW supports in NR"; 3GPP TSG-RAN WG2 NR #98 Meeting, R2-1704501; Hangzhou, China, May 15-19, 2017, (6 pages).

* cited by examiner

USER TERMINAL, RADIO BASE STATION AND RADIO COMMUNICATION METHOD

TECHNICAL FIELD

The present disclosure relates to a user terminal, a radio base station and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than LTE, LTE successor systems (also referred to as LTE Advanced (LTE-A), Future Radio Access (FRA), 4G, 5G, 5G+(plus), New-RAT (NR), or LTE Rel. 14 and 15~) have been also studied.

Furthermore, legacy LTE systems (e.g., LTE Rel. 8 to 13) perform communication on Downlink (DL) and/or Uplink (UL) in a subframe of one ms as a scheduling unit. The subframe is composed of 14 symbols of 15 kHz in a subcarrier spacing in a case of, for example, a general Cyclic Prefix. The subframe is also referred to as a Transmission Time Interval (TTI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It has been studied for a future radio communication system (e.g., NR) to configure to a user terminal (UE: User Equipment) one or a plurality of Bandwidth parts (BWP) included in a Component Carrier (CC) or a system bandwidth. A BWP used for DL communication may be referred to as a DL BWP, and a BWP used for UL communication may be referred to as a UL BWP.

It has been studied for NR to reserve given time/frequency resources in a time unit (e.g., a slot and/or a mini slot) that is a data channel scheduling unit for forward compatibility. The given time/frequency resources may be referred to as unknown resources, reserved resources, blank resources or unused resources.

It is thought for NR to use control based on a BWP. However, how a UE learns a blank resource in a case where the BWP is introduced has not been studied yet. If an appropriate blank resource decision method is not introduced, there is a risk that flexible control cannot be performed, and a communication throughput and frequency use efficiency deteriorate.

It is therefore one of objects of the present disclosure to provide a user terminal, a radio base station and a radio communication method that can prevent a communication throughput from lowering even when performing control based on a BWP.

Solution to Problem

A user terminal according to one aspect of the present invention includes: a control section that decides a blank resource area configured in association with a given Bandwidth part (BWP); and a transmission/reception section that performs transmission and/or reception processing by taking the blank resource area into account, and the control section decides the blank resource area assuming one of following (1) to (3): (1) an entire bandwidth of the given BWP is the blank resource area in a given period; (2) part of the bandwidth of the given BWP is the blank resource area in the given period; and (3) the given BWP does not include the blank resource area in the given period.

Advantageous Effects of Invention

According to one aspect of the present disclosure, it is possible to prevent a communication throughput from lowering even when performing control based on a BWP.

DESCRIPTION OF EMBODIMENTS

It has been studied for future radio communication systems (e.g., at least one of NR, 5G and 5G+ that will be referred to simply as NR below) to use time units (e.g., a slot and/or a mini slot and/or one or a plurality of OFDM symbols) different from subframes of legacy LTE systems (e.g., LTE Rel. 8 to 13) as a data channel scheduling unit.

In this regard, the data channel may be a DL data channel (e.g., a downlink shared channel (PDSCH: Physical Downlink Shared Channel) or a UL data channel (e.g., uplink shared channel (PUSCH: Physical Uplink Shared Channel), or may be referred to simply as data or a shared channel.

In this regard, the slot is a time unit based on numerologies (e.g., a subcarrier spacing and/or a symbol length) applied by a UE. The number of symbols per slot may be determined according to the subcarrier spacing. When, for example, the subcarrier spacing is 15 kHz or 30 kHz, the number of symbols per slot may be 7 or 14 symbols. On the other hand, when the subcarrier spacing is 60 kHz or more, the number of symbols per slot may be 14 symbols. A mini slot is a time unit having a time duration (or a smaller number of symbols) shorter than the slot.

Figure 1:
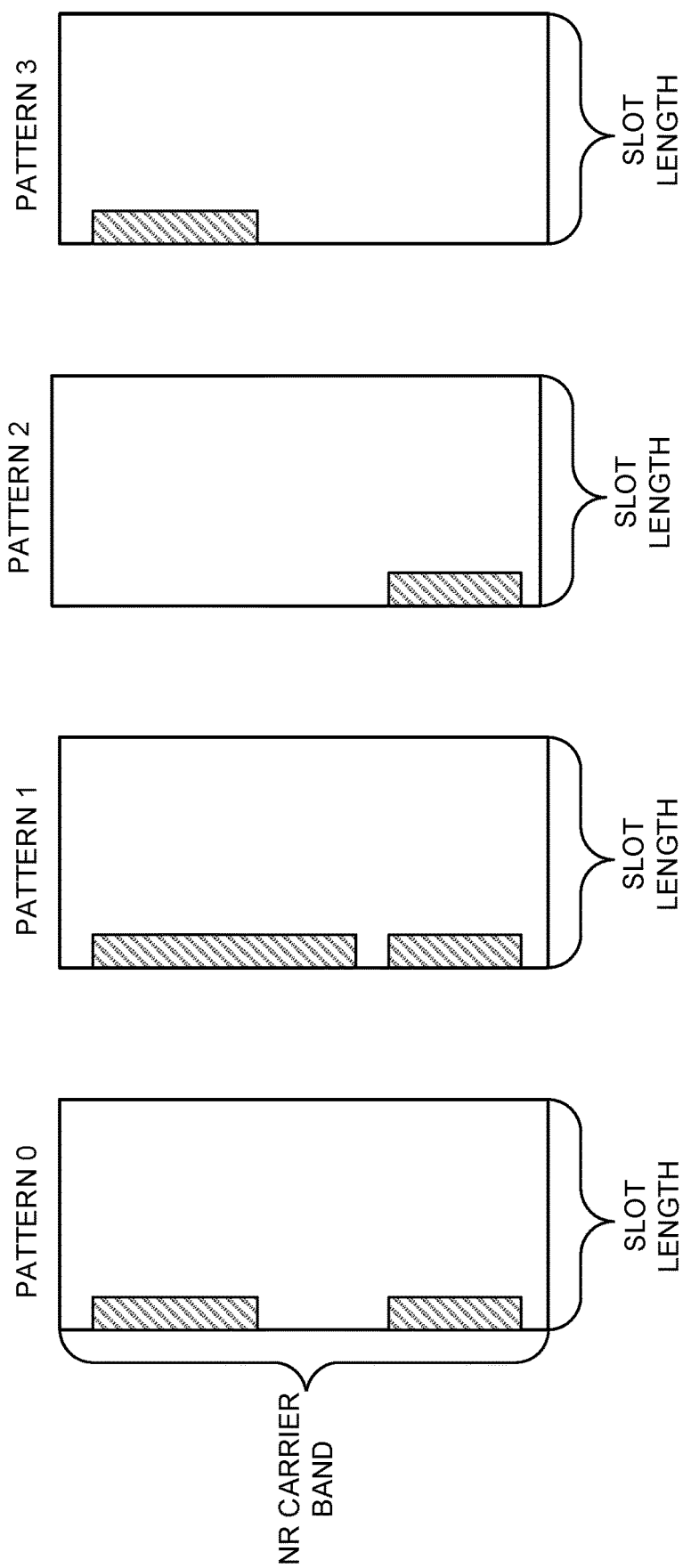
FIG. 1 is a diagram illustrating one example of resource sharing between a DL control channel and a DL data channel.

It has been studied for NR to share resources (that may be referred to as resource sharing) between a DL control channel (e.g., PDCCH (Physical Downlink Control Channel) and a DL data channel (e.g., PDSCH). FIG. 1 is a diagram illustrating one example of resource sharing between the DL control channel and the DL data channel.

As illustrated in FIG. 1, given time and/or frequency resources (time/frequency resources) are reserved for the DL control channel, and the DL control channel is allocated to at least part of the given time and/or frequency resources.

That is, the given time and/or frequency resources may include candidate areas to which one or a plurality of DL control channels are allocated, and the candidate areas may be referred to as control resource sets (CORESET), control subbands, search space sets, search space resource sets, control areas, control subbands or NR-PDCCH areas.

The given time and/or frequency resources may be referred to as reserved resources. A reserved resource configuration (also referred to as a pattern or a reserved resource pattern) fluctuates depending on, for example, the number of UEs to be scheduled in a slot and UE capability. The reserved resource may correspond to an entire CORESET area that can be used by one or a plurality of UEs in a given time unit.

As illustrated in FIG. 1, a plurality of reserved resource patterns (patterns 0 to 3 in this case) may be configured to the UE semi-statically (by high layer signaling (e.g., Radio Resource Control (RRC) signaling or broadcast information (a Master Information Block (MIB) or a System Information Block (SIB)).

The UE may receive CORESET configuration information (that may be referred to as a CORESET configuration) from a base station (that may be referred to as, for example, a Base Station (BS), a Transmission/Reception Point (TRP), an eNode B (eNB) and a gNB). The CORESET configuration may be notified by, for example, higher layer signaling (e.g., RRC signaling and/or an SIB).

The UE monitors (blind-decodes) one or a plurality of CORESETs (or search spaces in the CORESETs) configured to the own terminal, and detects a DL control channel (Downlink Control Information (DCI)) for the UE.

A reserved resource pattern used for a certain slot may be dynamically instructed to the UE from a plurality of reserved resource patterns by given DCI. The given DCI may be notified by using a PDCCH (that may be referred to as a group common PDCCH or group common DCI) that is common between one or more UEs, may be notified by using a UE-specific PDCCH (that may be referred to as DCI for scheduling) or may be notified by a downlink control channel different from the PDCCH.

In addition, DCI for scheduling DL data (e.g., PDSCH) reception and/or measurement of a DL reference signal may be referred to as a DL assignment, a DL grant or DL DCI. DCI for scheduling UL data (e.g., PUSCH) transmission and/or transmission of a UL sounding (measurement) signal may be referred to as a UL grant or UL DCI.

The UE may perform reception processing (decoding) on the DL data channel based on the dynamically instructed reserved resource pattern and the DL assignment. The UE may perform transmission processing (encoding) on the UL data channel based on the dynamically instructed reserved resource pattern and the UL grant.

In addition, an NR carrier band in FIG. 1 may be a Component Carrier (CC) (also referred to as, for example, 200 MHz or a system band) allocated to the UE or may be a Bandwidth part (BWP) that is at least part of the CC. One or more BWPs are configured to the UE.

Configuration information of each BWP configured to the UE may include information indicating at least one of numerologies of each BWP, a frequency position (e.g., center frequency), a bandwidth (also referred to as, for example, the number of Resource Blocks (also referred to as RBs or Physical RBs (PRBs)), and a time resource (e.g., a slot (mini slot), an index or a periodicity). The configuration information may be notified to the UE by higher layer signaling or Medium Access Control (MAC) signaling.

NR is assumed to be standardized stepwise similar to initial introduction (e.g., 5G, LTE Rel. 15 and subsequent releases or phase 1) and persistent development (e.g., 5G+, LTE Rel. 16 and subsequent releases or phase 2) of an initially introduced specification. Hence, it is desired to configure a time unit (e.g., a slot and/or a mini slot) that becomes a data channel scheduling unit by taking forward compatibility into account.

Therefore, it has been studied to reserve given time/frequency resources in the time unit (e.g., a slot and/or a mini slot) that is the data channel scheduling unit for forward compatibility. The given time/frequency resources will be also referred to as unknown resources, reserved resources, blank resources or unused resources. The blank resources may be configured as the reserved resources described with reference to FIG. 1 (at least part of the reserved resources may overlap), or may be configured separately from the reserved resources.

Figure 2:
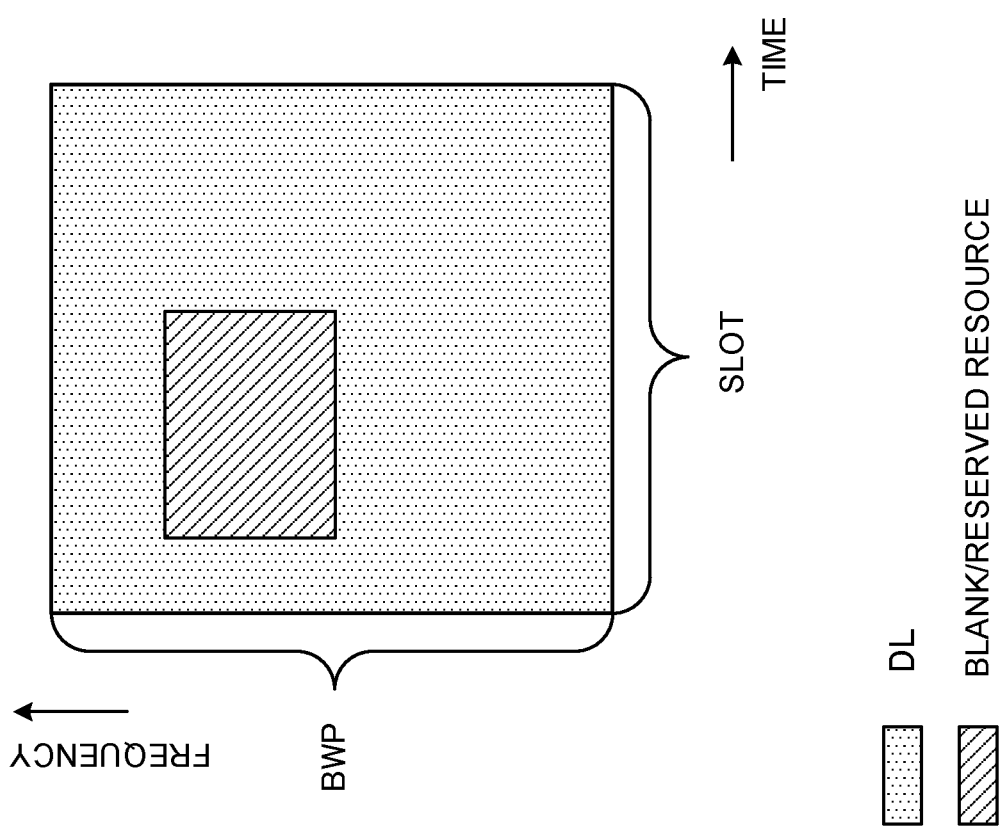
FIG. 2 is a diagram illustrating one example of a blank resource.

FIG. 2 is a diagram illustrating one example of a blank resource. As illustrated in FIG. 2, the blank resource may include at least part of symbols in a slot and/or at least part of PRBs in a carrier (or the BWP). The UE should not assume (or carry out) transmission/reception control and/or an operation regarding the blank resource.

For example, a PDSCH for the UE may be allocated to the slot in FIG. 2. On the other hand, the UE may assume that the PDSCH is not allocated in the blank resource in the slot, and perform receiving processes (e.g., at least one of demodulation, decoding and rate matching) of the PDSCH.

Thus, according to NR, control based on the BWP is assumed to be used. However, study regarding how the UE learns a blank resource when a BWP is introduced has not advanced yet. If an appropriate blank resource decision method is not introduced, there is a risk that flexible control cannot be performed or a given signal fails to be decoded, and therefore a communication throughput and frequency use efficiency deteriorate.

Hence, the inventors have conceived appropriately deciding a blank resource area configured in association with a given BWP, and conceived preventing the communication throughput from lowering.

The embodiments will be described in detail below with reference to the drawings. In this regard, the BWP may be read as a DL BWP, a UL BWP or other BWPs in the following description.

First Embodiment

According to the first embodiment, information related to a set of one or a plurality of blank resources (that may be referred to as a blank resource pattern or a blank resource area) is decided based on a BWP configuration. The information may be referred to as blank resource information. One or a plurality of related blank resource patterns may be configured to UE per BWP.

The blank resource may be defined in a time unit that is a data channel scheduling unit. The time unit may be expressed as one or more symbols, mini slots, slots or subframes.

Blank resource information may include information (e.g., a start PRB index or the number of PRBs) related to frequency resources of one or a plurality of blank resources, information (e.g., an index, the number, a duration and a periodicity of the given time units (symbols, mini slots or slots) related to times resources of one or a plurality of blank resources, and information such as indices of one or a plurality of blank resources patterns.

Each BWP configuration may explicitly or implicitly include the blank resource information. A BWP configuration including the blank resource information may be notified by, for example, higher layer signaling (e.g., RRC signaling or an SIB).

The UE may decide the blank resource information based on at least one of pieces of information such as configured (and/or active) BWP numerologies (e.g., SCS), a frequency position (e.g., center frequency) and a bandwidth (e.g., the number of PRBs). The UE may specify an assumed blank resource pattern based on which BWP is active.

The UE may decide the blank resource information in a period specified by the information based on information related to time resources such as a system frame number, a slot (mini slot) index and a subframe index.

The UE may specify the assumed blank resource pattern in the active BWP based on higher layer signaling, physical layer signaling (e.g., DCI) or a combination of these. For example, the UE may decide the assumed blank resource pattern in the active BWP based on one specified blank resource information based on given DCI among one or a plurality of pieces of configured blank resource information. In this regard, the given DCI may be DCI for scheduling or DCI that is common between groups.

Figure 3:
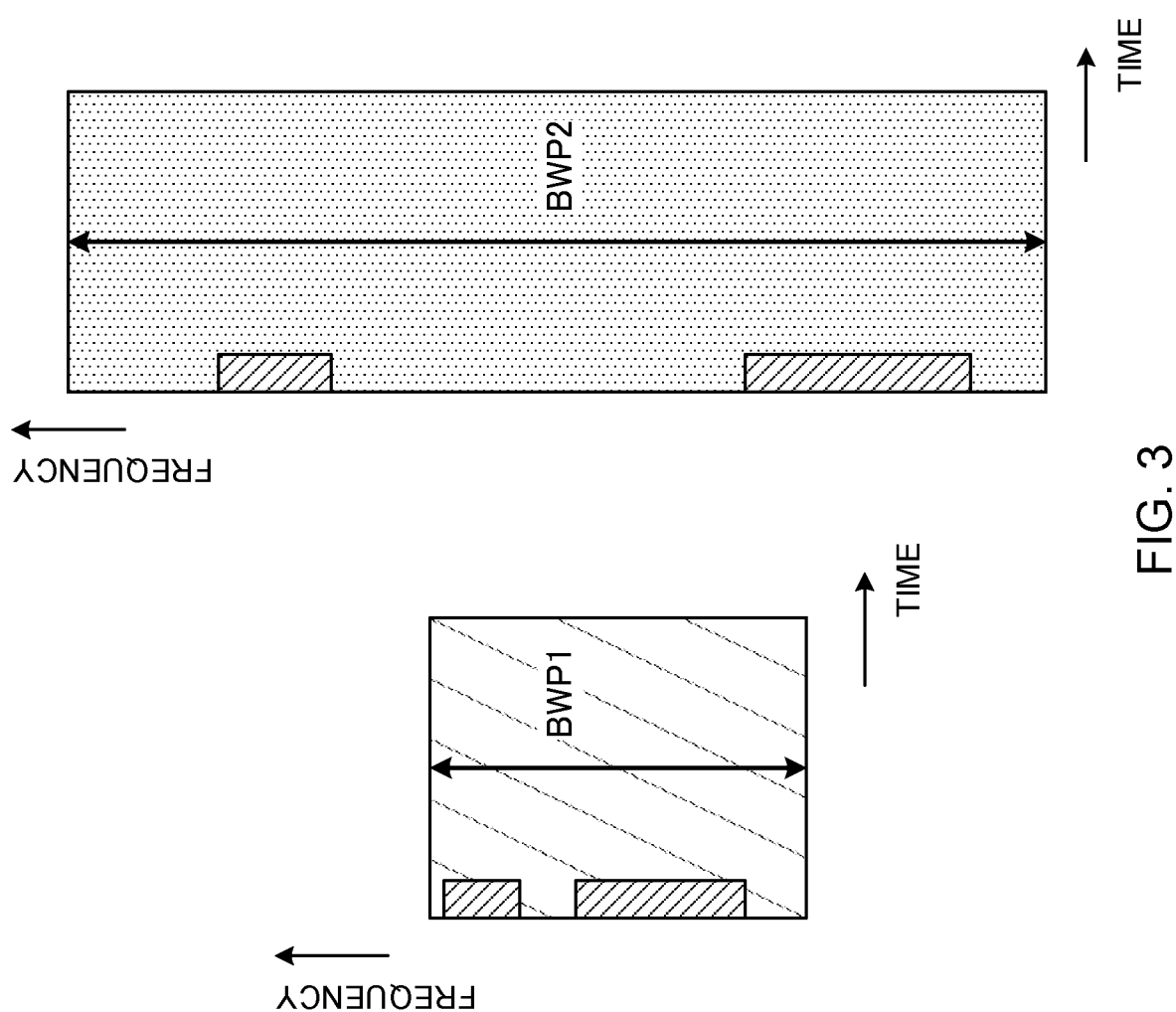
FIG. 3 is a diagram illustrating one example of an association between BWPs and blank resources according to a first embodiment.

FIG. 3 is a diagram illustrating one example of an association between BWPs and blank resources according to the first embodiment. In this example, a BWP 1 and a BWP 2 have respectively different bandwidths. The blank resource of the BWP 1 and the blank resource of the BWP 2 are independently configured respectively, and are arranged in different resources in a given slot.

Figure 4:
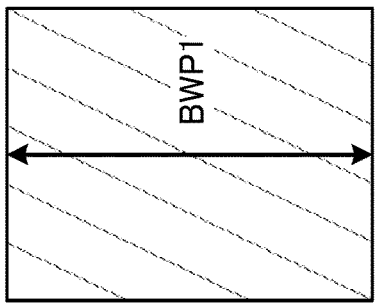
FIG. 4 is a diagram illustrating another example of an association between the BWPs and the blank resources according to the first embodiment.
Figure 4:
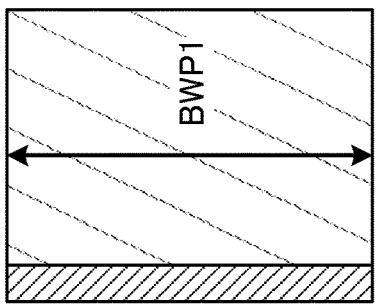
Figure 4:
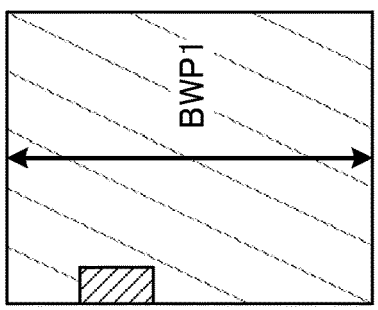
Figure 4:
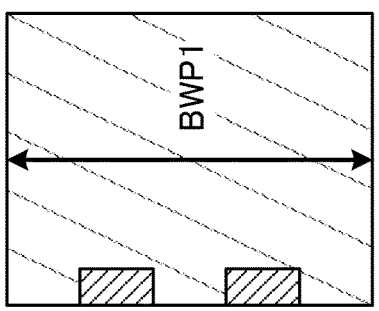
Figure 4:
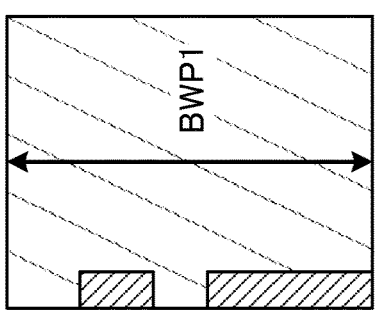
Figure 5:
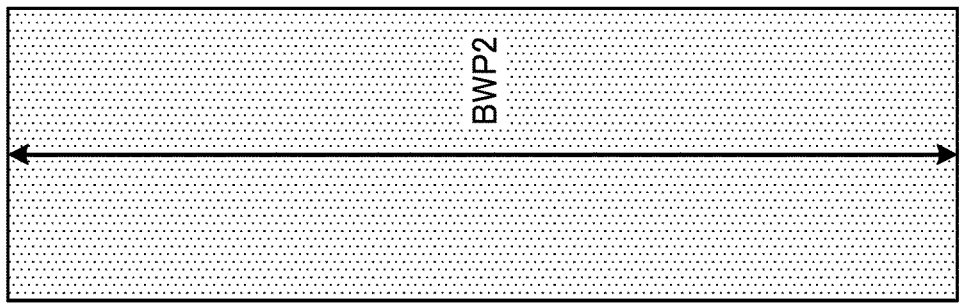
FIG. 5 is a diagram illustrating still another example of the association between the BWPs and the blank resources according to the first embodiment.
Figure 5:
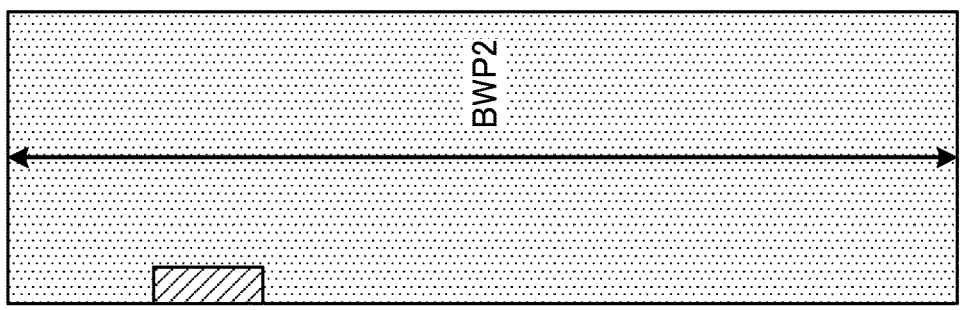
Figure 5:
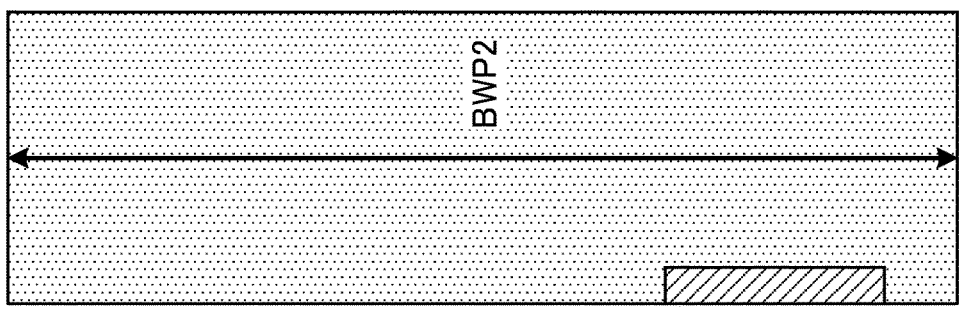
Figure 5:
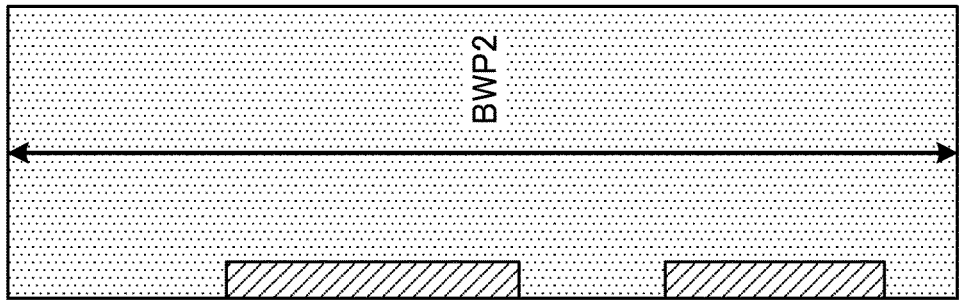
Figure 5:
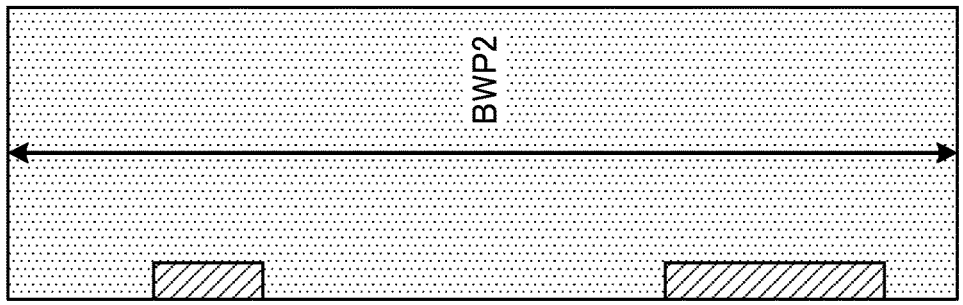

FIG. 4 is a diagram illustrating another example of an association between the BWPs and the blank resources according to the first embodiment. FIG. 5 is a diagram illustrating still another example of an association between the BWPs and the blank resources according to the first embodiment. FIGS. 4 and 5 each illustrate five examples of the blank resource pattern that can be configured in association with the BWP 1 and the BWP 2.

For example, as illustrated in order from the left in FIG. 4, the UE may decide the blank resource pattern of the given BWP (e.g., active BWP) assuming one of the followings (the UE may assume that one of the following blank resource patterns is used):

(1) A blank resource pattern includes a plurality of blank resources having respectively different numbers of PRBs in a given period (e.g., one or a plurality of symbols or one or a plurality of slots (mini slots));

(2) A blank resource pattern includes a plurality of blank resources having the same number of PRBs in the given period;

(3) A blank resource pattern includes one blank resource having a given number of PRBs in the given period;

(4) An entire bandwidth of a given BWP is a blank resource in the given period; and (5) The given BWP does not include the blank resource in the given period.

In this regard, above (1) to (3) may be read as that "part of the bandwidth of the given BWP is a blank resource in the given period". The number of PRBs may be read as the number of subcarriers or the number of subbands.

In addition, a plurality of these assumed blank resources may be a plurality of blank resources that are non-contiguous in time and/or frequency directions, or may be a plurality of blank resources that are contiguous (neighboring) in the time and/or frequency directions.

In above (1) to (3), the number of PRBs of a blank resource may be expressed by an exponential of a given number (e.g., two) or may be expressed by an integer multiple or a decimal multiple of the given number (e.g., two, three, four and . . . ). In this case, it is easy to arrange the blank resource and another resource (e.g., a resource to which a PDSCH is allocated) without a gap, and prevent frequency use efficiency from lowering.

In above (1) to (3), a position of one blank resource may be indicated by a relative position based on another blank resource. The blank resource information may include information related to the relative position. In this case, it is possible to prevent an increase in an information amount of the blank resource information.

In above (1) to (3), the position and/or the number of PRBs of the one blank resource may be indicated by relative values based on a given BWP configuration. For example, a case will be described where a BWP having a bandwidth of 10 PRBs is a reference. In a case of a blank resource to which "1" is configured as a value of the number of PRBs, when the blank resource is included in a BWP having the bandwidth of the 10 PRBs, an absolute value of the number of PRBs may be decided as one, and, when the blank resource is included in a BWP having the bandwidth of the 30 PRBs, the absolute value of the number of PRBs may be decided as three. In this case, it is possible to prevent the increase in the information amount of the blank resource information.

The reference BWP configuration (or BWP configuration parameters) may be configured by higher layer signaling or may be defined by a specification.

The assumption in above (4) may be carried out in a BWP that satisfies given conditions. For example, the UE may assume above (4) when the bandwidth of the given BWP is a given value or less, and may not assume above (4) when the bandwidth of the given BWP is larger than the given value. The BWP 1 in FIG. 4 corresponds to the example where the bandwidth is the given value or less, and the BWP 2 in FIG. 5 corresponds to the example where the bandwidth is larger than the given value.

Above (5) may indicate that the blank resource pattern does not include the blank resource (there is no blank resource) and indicate that the blank resource pattern includes the blank resource (there is the blank resource). The blank resource information may include information related to whether or not there is a blank resource in the given period. The information related to whether or not there is the blank resource can be expressed by one bit, so that it is possible to prevent in the increase in the information amount of the blank resource information.

Regarding above (5), the given BWP may include a CORESET resource during the given period. In this case, by taking resources of a CORESET in the given period into account, the UE may perform reception processing (e.g., demodulation, decoding and rate matching) of the PDSCH or transmission processing (e.g., encoding and modulation) of the PUSCH in the given period. Furthermore, the UE may perform the reception processing or the transmission processing based on DCI received in a CORESET of another slot or mini slot.

According to the above-described first embodiment, a blank resource pattern can be configured specifically to the UE and specifically to the BWP, so that it is possible to perform flexible control.

When, for example, the blank resource corresponding to the assumption of above (1) is used, a plurality of different CORESETs configured by different resource area sizes or an identical CORESET configured to a non-contiguous resource in the frequency area can be respectively multiplexed on blank resources of different resource area sizes.

When the blank resource corresponding to the assumption in above (2) is used, it is easy to reduce a signaling overhead that is necessary for a configuration by making the resource area size the same between a plurality of blank resources.

When the blank resource corresponding to the assumption in above (3) is used, it is possible to reduce the signaling overhead compared to above (1) and above (2).

When the blank resource corresponding to the assumption in above (4) is used, the CORESETs configured by any resource area size can be multiplexed on the blank resource.

When the blank resource corresponding to the assumption in above (5) is used, and a data channel is scheduled in a slot to which the CORESET is not configured, an unnecessary blank resource is not configured, so that it is possible to improve resource efficiency.

Second Embodiment

According to the second embodiment, when a plurality of BWPs are configured to the UE, a common blank resource pattern related to a plurality of BWPs is configured to the UE.

The UE may specify an assumed blank resource pattern irrespectively of which BWP is active. It may be assumed that the common blank resource pattern is associated with given time and frequency resources in a CC (system band) including a BWP.

The UE may specify the common blank resource pattern based on higher layer signaling, physical layer signaling (e.g., DCI) or a combination of these. Description of the same points such as blank resource information, information included in a BWP configuration, a notifying method of these pieces of information and a resource pattern specifying method as those in the first embodiment will not be repeated.

Each BWP configuration may explicitly or implicitly include the common blank resource information. Part of the BWP configuration may not include the common blank resource information. Furthermore, when the common blank resource pattern is defined by a specification and therefore the UE can learn the common blank resource pattern, blank resource information may not be included in any BWP configuration. Furthermore, the common blank resource information may be configured separately from the BWP configuration.

The UE may assume that at least part of frequency resources of a plurality of BWPs overlap. The UE may assume that a blank resource pattern used in a BWP of a narrower bandwidth among a plurality of BWPs is a resource pattern (or is included in the resource pattern) used in a BWP of a wider bandwidth.

Figure 6:
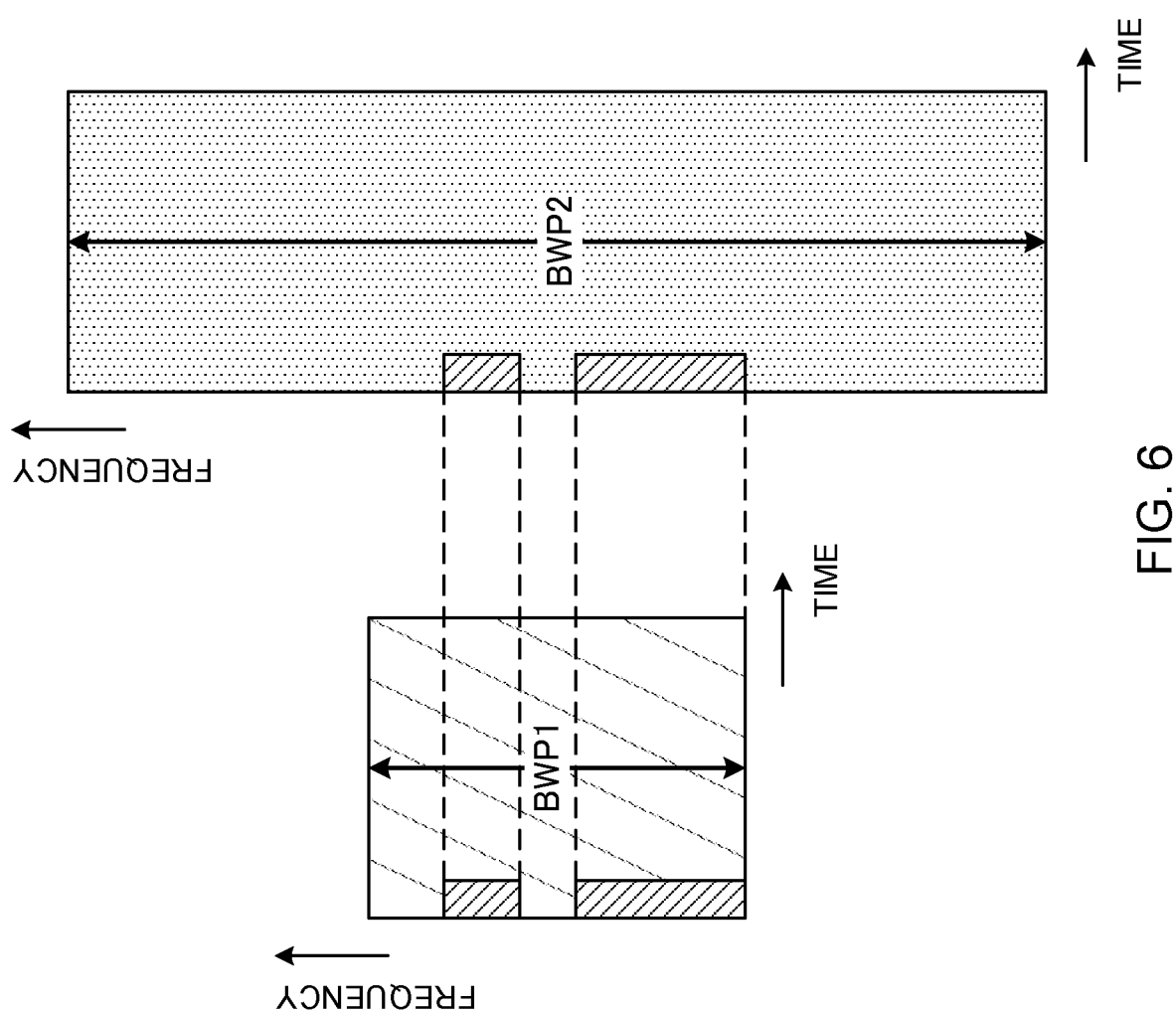
FIG. 6 is a diagram illustrating one example of an association between BWPs and blank resources according to a second embodiment.

FIG. 6 is a diagram illustrating one example of an association between BWPs and blank resources according to the second embodiment. In this example, a BWP 1 and a BWP 2 have respectively different bandwidths. The blank resource of the BWP 1 and the blank resource of the BWP 2 may be commonly configured, and may be arranged in the same time and frequency resources in a given slot. In this example, a common blank resource is arranged at a slot head near a center frequency of each BWP.

In addition, although the example in FIG. 6 has described the case where the common blank resource is a resource included in all of a plurality of BWPs, the common blank resource is not limited to this. For example, the common blank resource pattern may be associated with a blank resource over a wider bandwidth (e.g., system bandwidth) than the bandwidth of one of BWPs. For an active BWP, the UE only needs to take into account a blank resource included in a band of the BWP of the common blank resource pattern.

In other words, the UE may ignore blank resources outside a range of the active BWP among blank resources included in the common blank resource pattern.

Figure 7:
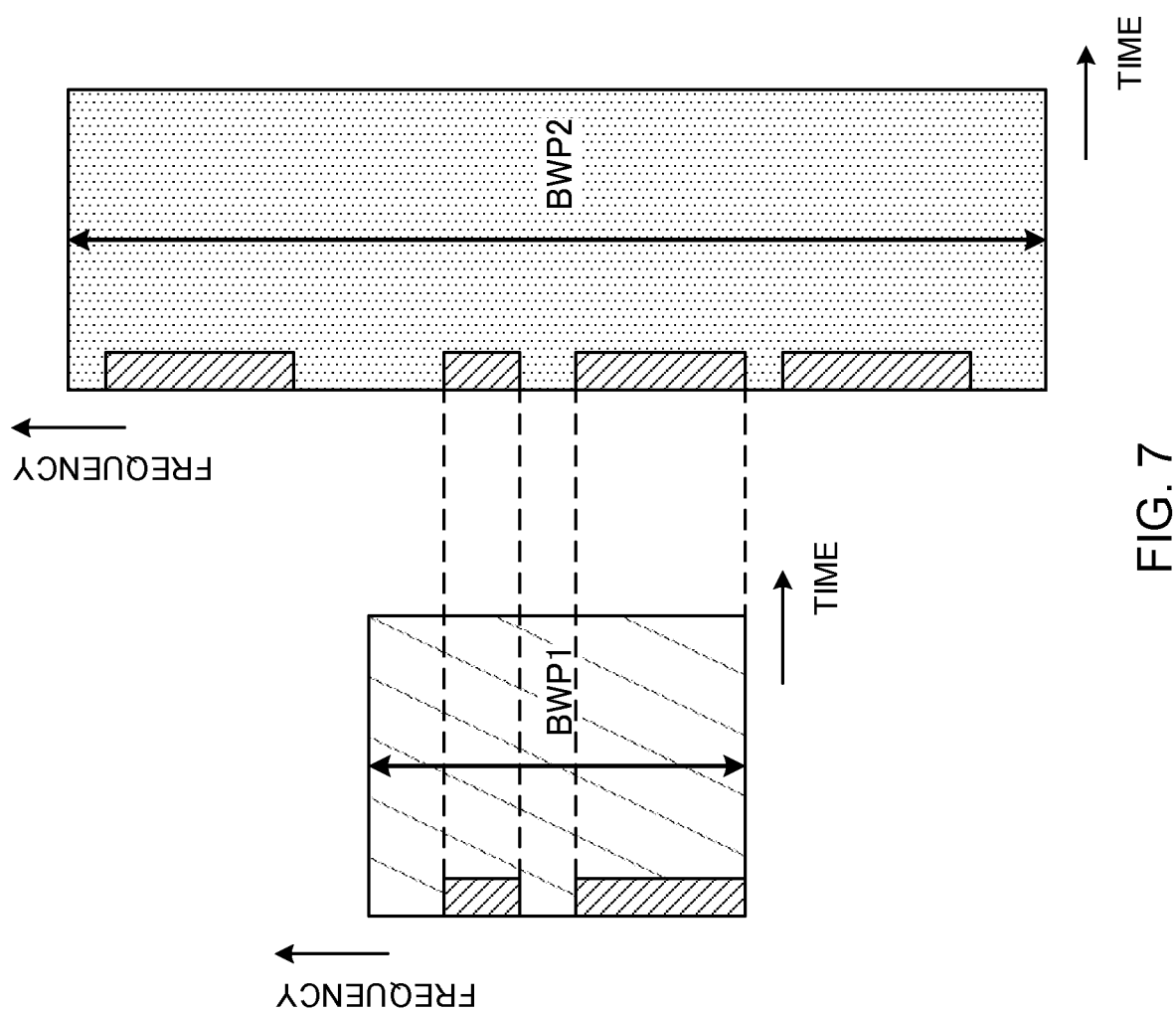
FIG. 7 is a diagram illustrating another example of the association between the BWPs and the blank resources according to the second embodiment.

FIG. 7 is a diagram illustrating another example of an association between BWPs and blank resources according to the second embodiment. This example employs the same configuration of the BWP as that in the example in FIG. 6. The blank resource of the BWP 1 and the blank resource of the BWP 2 are commonly configured, and are arranged over the bandwidth of the BWP 2. When the BWP 2 is active, the UE can take the blank resource in the BWP 2 into account. When the BWP 1 is active, the UE only needs to take into account only the blank resource in the BWP 1 of the common blank resource pattern.

According to the above-described second embodiment, the blank resource pattern can be configured specifically to the UE and commonly to the BWP, so that it is possible to perform flexible control.

Modified Example

A blank resource pattern related to DL (DL BWP) and a blank resource pattern related to UL (UL BWP) may be each individually configured to a UE or may be commonly configured. In, for example, the second embodiment, a plurality of BWPs may include DL BWPs and UL BWPs.

Blank resource information may include at least one of DL blank resource information that is handled as a blank resource in a time unit (a slot or a mini slot) for scheduling DL, and UL blank resource information that is handled as a blank resource in the time unit for scheduling UL.

The DL blank resource information may be included in configuration information of the DL BWPs. The UL blank resource information may be included in configuration information of the UL BWPs. Furthermore, these pieces of blank resource information may be included as the common blank resource information in one of pieces of the configuration information of the DL BWPs and/or the UL BWPs or may be notified separately from the configuration information of the BWPs.

(Radio Communication System)

The configuration of the radio communication system according to one embodiment of the present disclosure will be described below. This radio communication system is applied the radio communication method according to each of the above embodiments. In addition, the radio communication method according to each of the above embodiments may be applied alone or may be applied in combination.

Figure 8:
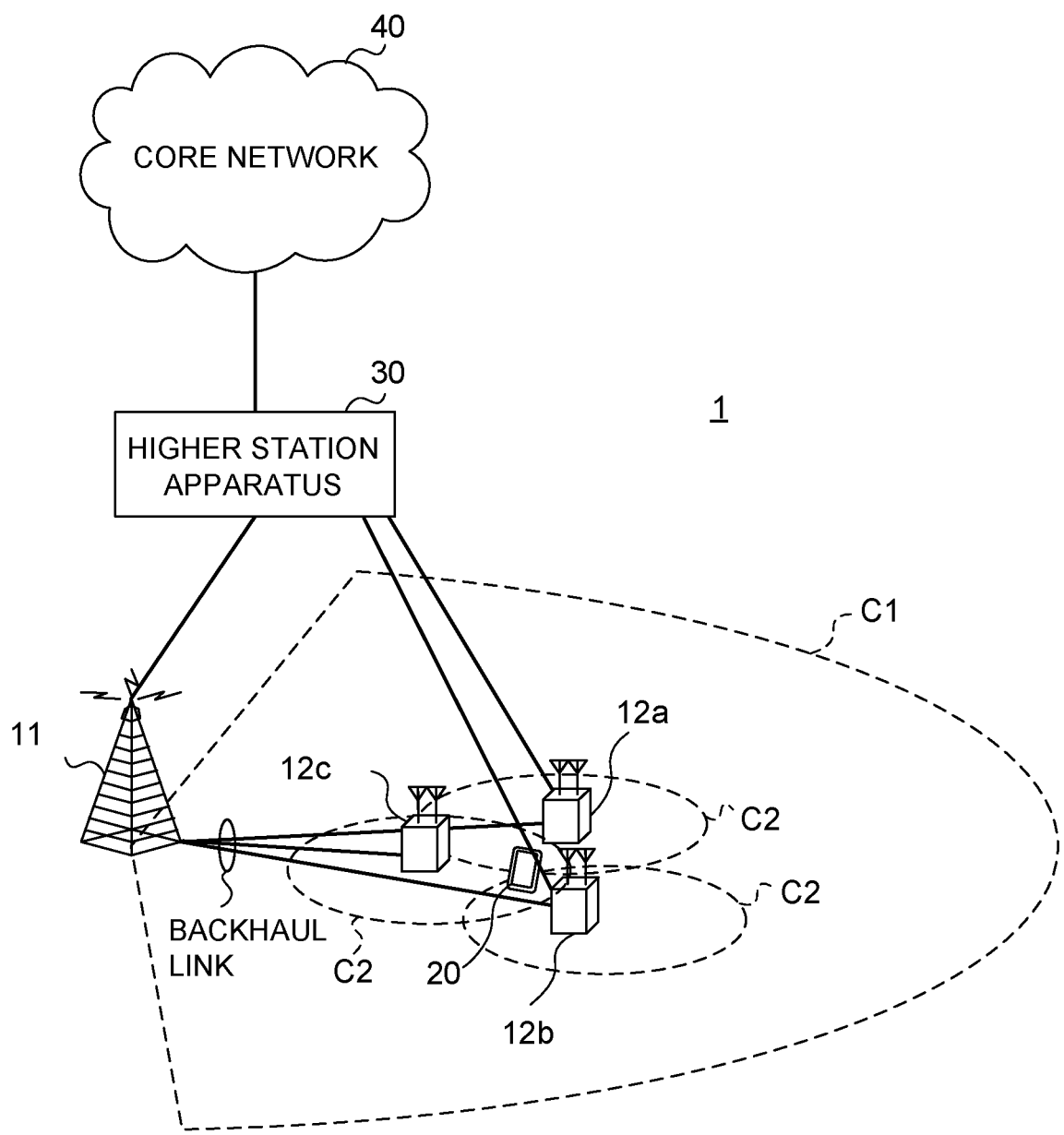
FIG. 8 is a diagram illustrating one example of a schematic configuration of a radio communication system according to one embodiment.

FIG. 8 is a diagram illustrating one example of a schematic configuration of the radio communication system according to the one embodiment. A radio communication system 1 can apply Carrier Aggregation (CA) and/or Dual Connectivity (DC) that aggregate a plurality of base frequency blocks (component carriers) whose one unit is a system bandwidth (e.g., 20 MHz) of the LTE system. In this regard, the radio communication system 1 may be referred to SUPER 3G, LTE-Advanced (LTE-A), IMT-Advanced, 4G, 5G, Future Radio Access (FRA) and New-RAT (NR).

The radio communication system 1 illustrated in FIG. 8 includes a radio base station 11 that forms a macro cell C1, and radio base stations 12a to 12c that are located in the macro cell C1 and form small cells C2 narrower than the macro cell C1. Furthermore, a user terminal 20 is located in the macro cell C1 and each small cell C2. Different numerologies may be configured to be applied between cells. In this regard, the numerologies refer to a communication parameter set that characterizes a signal design of a certain RAT.

The user terminal 20 can connect with both of the radio base station 11 and the radio base stations 12. The user terminal 20 is assumed to concurrently use the macro cell C1 and the small cells C2 that use different frequencies by CA or DC. Furthermore, the user terminal 20 can apply CA or DC by using a plurality of cells (CCs) (e.g., two CCs or more). Furthermore, the user terminal can use licensed band CCs and unlicensed band CCs as a plurality of cells.

Furthermore, the user terminal 20 can perform communication by using Time Division Duplex (TDD) or Frequency Division Duplex (FDD) in each cell. A TDD cell and an FDD cell may be each referred to as a TDD carrier (frame configuration type 2) and an FDD carrier (frame configuration first type 1).

Furthermore, each cell (carrier) may be applied a slot (also referred to as a TTI, a general TTI, a long TTI, a general subframe, a long subframe or a subframe) having a relatively long time duration (e.g., one ms), and/or a slot (also referred to as a mini slot, a short TTI or a short subframe) having a relatively short time duration. Furthermore, each cell may be applied a subframe of two or more time durations.

The user terminal 20 and the radio base station 11 can communicate by using a carrier (also referred to as a Legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz, 5 GHz or 30 to 70 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or by way of radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal but also a fixed communication terminal. Furthermore, the user terminal 20 can perform device-to-device communication (D2D) with the other user terminal 20.

The radio communication system 1 can apply Orthogonal Frequency-Division Multiple Access (OFDMA) to Downlink (DL), and apply Single Carrier Frequency Division Multiple Access (SC-FDMA) to Uplink (UL) as radio access schemes. OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and OFDMA may be used on UL. Furthermore, SC-FDMA is applicable to Sidelink (SL) used for device-to-device communication.

The radio communication system 1 uses a DL data channel (PDSCH: Physical Downlink Shared Channel that is also referred to as a DL shared channel) shared by each user terminal 20, a broadcast channel (PBCH: Physical Broadcast Channel) and an L1/L2 control channel as DL channels. At least one of user data, higher layer control information and System Information Blocks (SIBs) is transmitted on the PDSCH. Furthermore, Master Information Blocks (MIBs) are transmitted on the PBCH.

The L1/L2 control channel includes a DL control channel (a Physical Downlink Control Channel (PDCCH) and/or an Enhanced Physical Downlink Control Channel (EPDCCH)), a Physical Control Format Indicator Channel (PCFICH), and a Physical Hybrid-ARQ Indicator Channel (PHICH). Downlink Control Information (DCI) including scheduling information of the PDSCH and the PUSCH is transmitted on the PDCCH. The number of OFDM symbols used for the PDCCH is transmitted on the PCFICH. The EPDCCH is subjected to frequency division multiplexing with the PDSCH and is used to transmit DCI similar to the PDCCH. Retransmission control information (also referred to as, for example, A/N, HARQ-ACK, HARQ-ACK bits or an A/N codebook) for the PUSCH can be transmitted on at least one of the PHICH, the PDCCH and the EPDCCH.

The radio communication system 1 uses a UL data channel (PUSCH: Physical Uplink Shared Channel that is also referred to as a UL shared channel) shared by each user terminal 20, a UL control channel (PUCCH: Physical Uplink Control Channel), and a random access channel (PRACH: Physical Random Access Channel) as UL channels. User data and higher layer control information are transmitted on the PUSCH. Uplink Control Information (UCI) including at least one of retransmission control information (A/N or HARQ-ACK) and Channel State Information (CSI) of the PDSCH is transmitted on the PUSCH or the PUCCH. A random access preamble for establishing connection with a cell can be transmitted on the PRACH.

<Radio Base Station>

Figure 9:
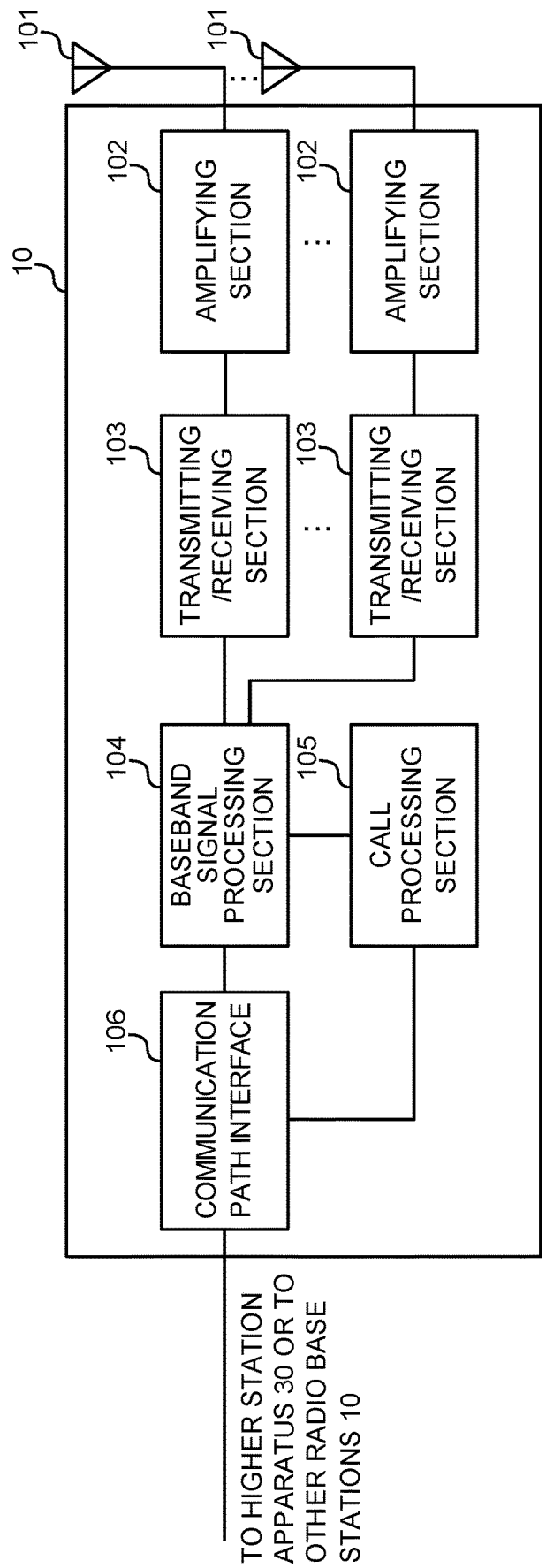
FIG. 9 is a diagram illustrating one example of an overall configuration of a radio base station according to the one embodiment.

FIG. 9 is a diagram illustrating one example of an overall configuration of the radio base station according to the one embodiment. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103. The radio base station 10 may configure a "reception apparatus" on UL, and configure a "transmission apparatus" on DL.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., Hybrid Automatic Repeat reQuest (HARM) processing), and transmission processing such as at least one of scheduling, transmission format selection, channel coding, rate matching, scrambling, Inverse Fast Fourier Transform (IFFT) processing, and precoding processing on the user data, and transfers the user data to each transmission/reception section 103. Furthermore, the baseband signal processing section 104 performs transmission processing such as channel coding and/or inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency band, and transmits a radio frequency signal. The radio frequency signal subjected to frequency conversion by each transmission/reception section 103 is amplified by each amplifying section 102, and is transmitted from each transmission/reception antenna 101.

The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal received by each transmission/reception antenna 101 as a UL signal. Each transmission/reception section 103 receives the UL signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on UL data included in the input UL signal, and transfers the UL data to the higher station apparatus 30 via the channel interface 106. The call processing section 105 performs at least one of call processing such as a configuration and release of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the neighboring radio base station 10 via an inter-base station interface (e.g., optical fibers compliant with the Common Public Radio Interface (CPRI) or the X2 interface).

Furthermore, each transmission/reception section 103 transmits a DL signal (e.g., at least one of DCI (including at least one of a DL assignment, a UL grant and common DCI), DL data (channel), a reference signal and higher layer control information), and/or receives a UL signal (e.g., at least one of UL data (channel), UCI, a reference signal and higher layer control information).

More specifically, each transmission/reception section 103 may transmit a DL data channel (e.g., PDSCH) and/or receive a UL data channel (e.g., PUSCH) in a transmission period (e.g., a slot, a mini slot or a given number of symbols) of a variable duration.

Each transmission/reception section 103 may perform transmission and/or reception processing by taking a blank resource area into account. Each transmission/reception section 103 may not perform the transmission and/or reception processing on a given signal (e.g., a PDSCH or a PUSCH) in the blank resource area.

Figure 10:
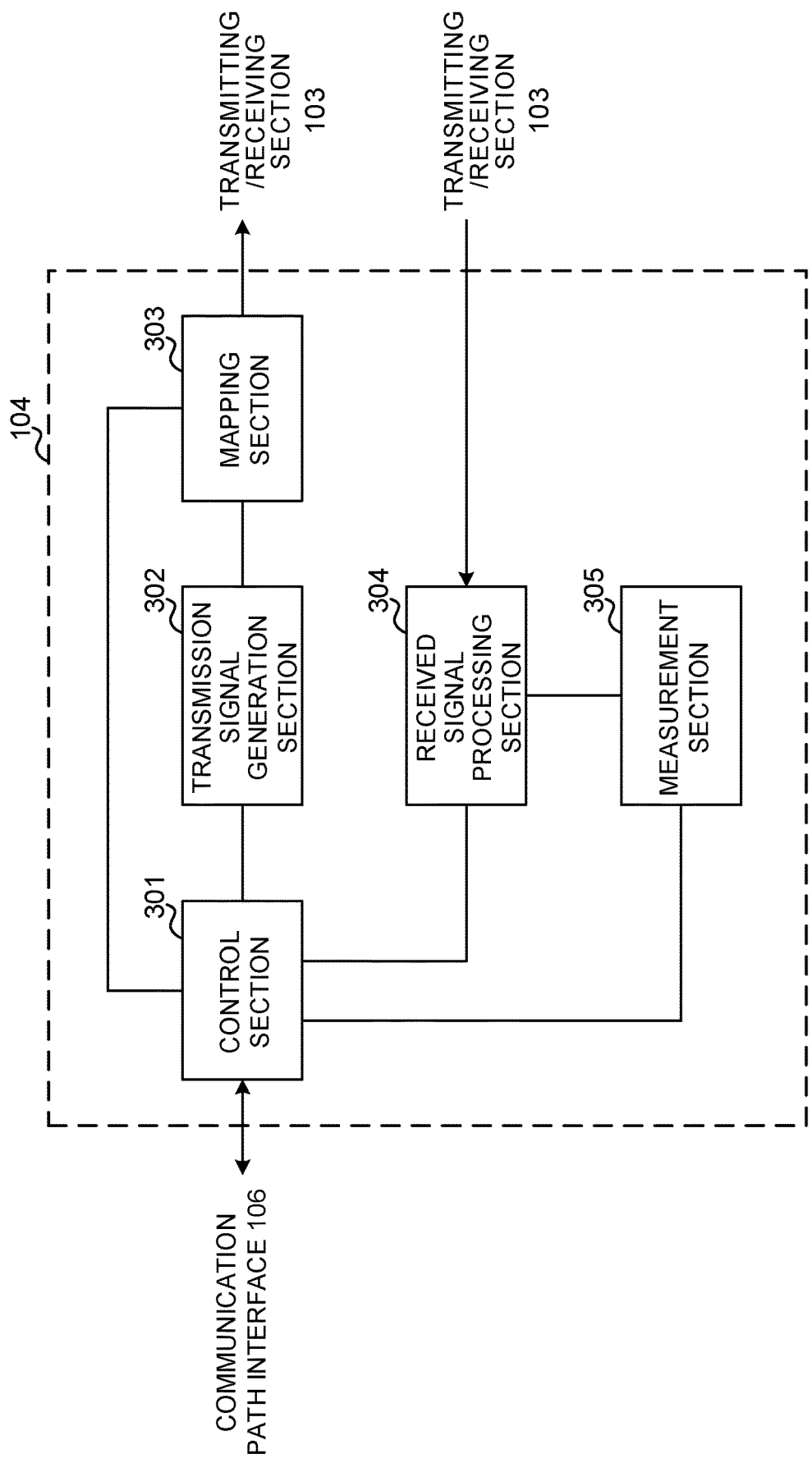
FIG. 10 is a diagram illustrating one example of a function configuration of the radio base station according to the one embodiment.

FIG. 10 is a diagram illustrating one example of a function configuration of the radio base station according to the one embodiment. In addition, FIG. 10 mainly illustrates function blocks of characteristic portions according to the present embodiment, and the radio base station 10 may include other function blocks, too, that are necessary for radio communication. As illustrated in FIG. 10, the baseband signal processing section 104 includes a control section 301, a transmission signal generating section 302, a mapping section 303, a received signal processing section 304 and a measurement section 305.

The control section 301 controls the entire radio base station 10. The control section 301 controls at least one of, for example, DL signal generation of the transmission signal generating section 302, DL signal mapping of the mapping section 303, UL signal reception processing (e.g., demodulation) of the received signal processing section 304 and measurement of the measurement section 305. Furthermore, the control section 301 may control scheduling of a data channel (including a DL data channel and/or a UL data channel).

The control section 301 may determine a blank resource area (blank resource pattern) for the user terminal in association with a given Bandwidth part (BWP). The control section 301 may control transmission and/or reception processing by taking the blank resource area into account.

The control section 301 may perform control to transmit information related to the blank resource area to the user terminal 20. For example, the control section 301 may perform control for including information related to a blank resource area of an active BWP in configuration information of the active BWP, and notifying the information. The control section 301 may perform control for notifying the information related to the blank resource area of the active BWP as information related to a blank resource area that is common between a plurality of BWPs. In addition, the common blank resource area may include a resource area outside a frequency band of at least one BWP among a plurality of BWPs configured to the user terminal 20.

The control section 301 may determine the blank resource area assuming one of following (1) to (3): (1) An entire bandwidth of a given BWP (e.g., active BWP) is a blank resource area in a given period; (2) Part of the bandwidth of the given BWP is the blank resource area in the given period; and (3) The given BWP does not include the blank resource area in the given period.

The control section 301 can be composed of a controller, a control circuit or a control apparatus described based on the common knowledge in the technical field according to the present invention.

The transmission signal generating section 302 may generate the DL signal (including at least one of DL data (channel), DCI, a DL reference signal and control information of higher layer signaling) based on an instruction from the control section 301, and outputs the DL signal to the mapping section 303.

The transmission signal generating section 302 can be composed of a signal generator, a signal generating circuit or a signal generating apparatus described based on the common knowledge in the technical field according to the present invention.

The mapping section 303 maps the DL signal generated by the transmission signal generating section 302, on a given radio resource based on the instruction from the control section 301, and outputs the DL signal to each transmission/reception section 103. For example, the mapping section 303 maps the reference signal on a given radio resource by using an arrangement pattern determined by the control section 301.

The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a UL signal transmitted from the user terminal 20. For example, the received signal processing section 304 may demodulate a UL data channel by using the reference signal of the arrangement pattern determined by the control section 301. More specifically, the received signal processing section 304 may output the received signal and/or the signal after reception processing to the measurement section 305.

The received signal processing section 304 can be composed of a signal processor, a signal processing circuit or a signal processing apparatus described based on the common knowledge in the technical field according to the present invention. Furthermore, the received signal processing section 304 can configure a reception section according to the present invention.

The measurement section 305 may measure UL channel quality based on, for example, received power (e.g., Reference Signal Received Power (RSRP)) and/or received quality (e.g., Reference Signal Received Quality (RSRQ)) of a reference signal. The measurement section 305 may output a measurement result to the control section 301.

<User Terminal>

Figure 11:
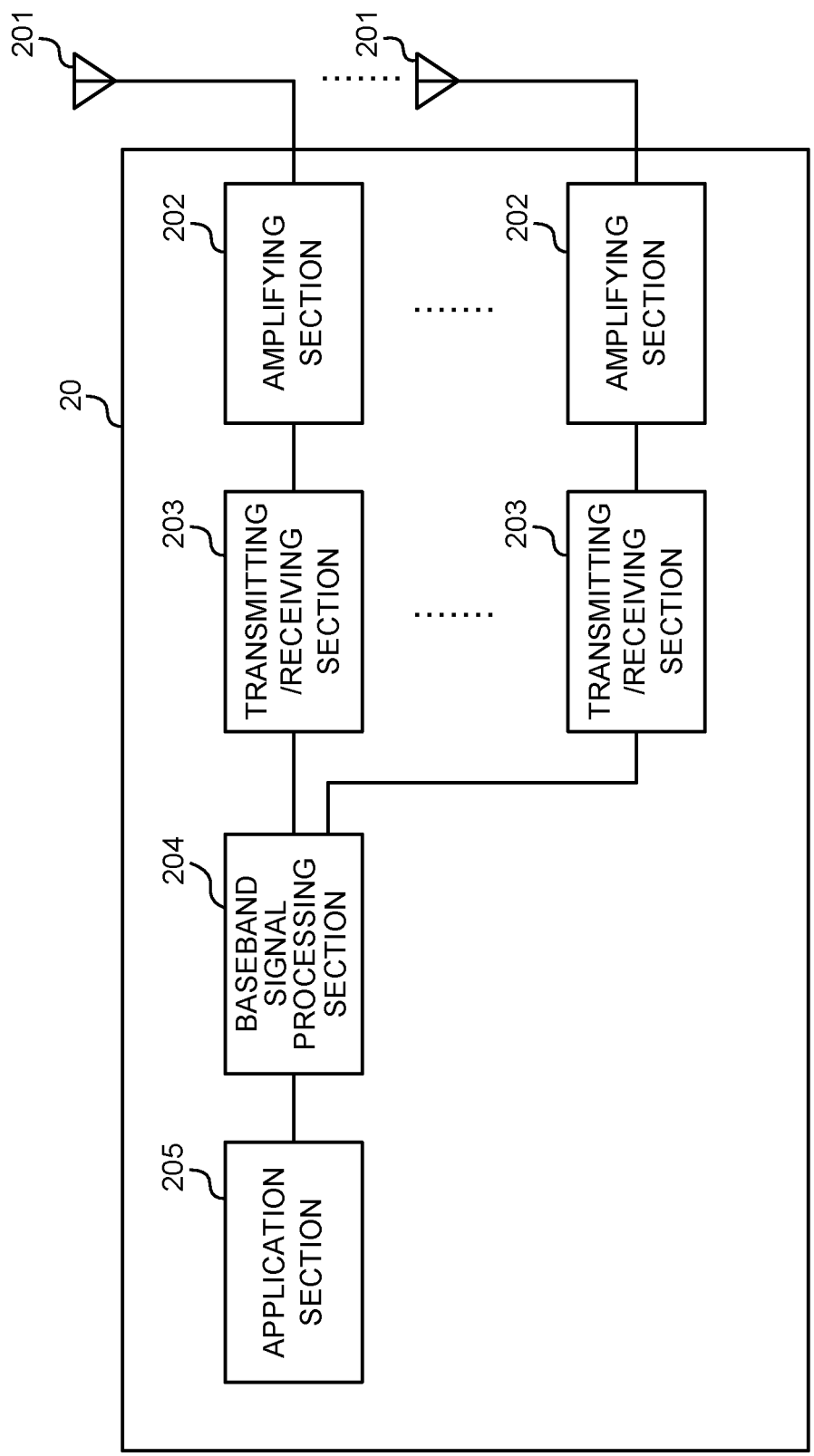
FIG. 11 is a diagram illustrating one example of an overall configuration of a user terminal according to the one embodiment.

FIG. 11 is a diagram illustrating one example of an overall configuration of the user terminal according to the one embodiment. The user terminal 20 includes pluralities of transmission/reception antennas 201 for MIMO transmission, amplifying sections 202 and transmission/reception sections 203, a baseband signal processing section 204 and an application section 205. The user terminal 20 may configure a "transmission apparatus" on UL, and configure a "reception apparatus" on DL.

The respective amplifying sections 202 amplify radio frequency signals received at a plurality of transmission/reception antennas 201. Each transmission/reception section 203 receives a DL signal amplified by each amplifying section 202. Each transmission/reception section 203 performs frequency conversion on the received signal into a baseband signal, and outputs the baseband signal to the baseband signal processing section 204.

The baseband signal processing section 204 performs at least one of FFT processing, error correcting decoding, and reception processing of retransmission control on the input baseband signal. The baseband signal processing section 204 transfers DL data to the application section 205. The application section 205 performs processing related to layers higher than a physical layer and an MAC layer.

On the other hand, the application section 205 inputs UL data to the baseband signal processing section 204. The baseband signal processing section 204 performs at least one of retransmission control processing (e.g., HARQ processing), channel coding, rate matching, puncturing, Discrete Fourier Transform (DFT) processing and IFFT processing on the UL data, and transfers the UL data to each transmission/reception section 203. UCI (e.g., at least one of A/N of a DL signal, Channel State Information (CSI) and a Scheduling Request (SR)) is also subjected to at least one of channel coding, rate matching, puncturing, DFT processing and IFFT processing, and is transferred to each transmission/reception section 203.

Each transmission/reception section 203 converts the baseband signal output from the baseband signal processing section 204 into a radio frequency band, and transmits a radio frequency signal. The radio frequency signal subjected to the frequency conversion by each transmission/reception section 203 is amplified by each amplifying section 202, and is transmitted from each transmission/reception antenna 201.

Furthermore, each transmission/reception section 203 receives a DL signal (e.g., at least one of DCI (including at least one of a DL assignment, a UL grant and common DCI), DL data (channel), a reference signal and higher layer control information), and/or transmits a UL signal (e.g., at least one of UL data (channel), UCI, a reference signal and higher layer control information).

More specifically, each transmission/reception section 203 may receive a DL data channel (e.g., PDSCH) and/or transmit a UL data channel (e.g., PUSCH) in a transmission period (e.g., a slot, a mini slot or a given number of symbols) of a variable duration.

Each transmission/reception section 203 may perform transmission and/or reception processing by taking a blank resource area into account. Each transmission/reception section 203 may not perform the transmission and/or reception processing on a given signal (e.g., a PDSCH or a PUSCH) in the blank resource area.

The transmission/reception sections 203 can be composed of transmitters/receivers, transmission/reception circuits or transmission/reception apparatuses described based on the common knowledge in the technical field according to the present invention. Furthermore, the transmission/reception sections 203 may be composed as an integrated transmission/reception section or may be composed of transmission sections and reception sections.

Figure 12:
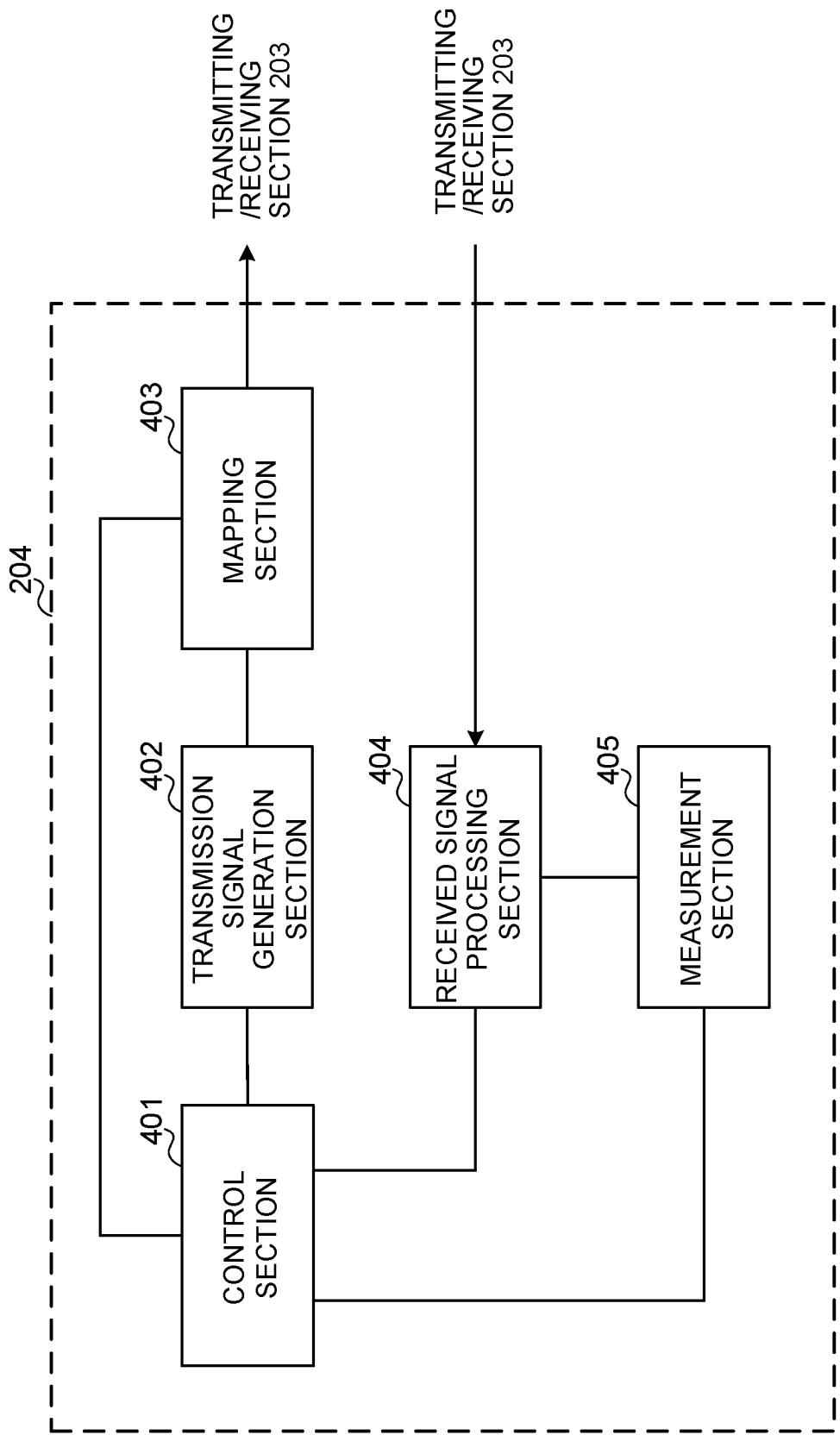
FIG. 12 is a diagram illustrating one example of a function configuration of the user terminal according to the one embodiment.

FIG. 12 is a diagram illustrating one example of a function configuration of the user terminal according to the one embodiment. In addition, FIG. 12 mainly illustrates function blocks of characteristic portions according to the present embodiment, and the user terminal 20 may include other function blocks, too, that are necessary for radio communication. As illustrated in FIG. 12, the baseband signal processing section 204 of the user terminal 20 includes a control section 401, a transmission signal generating section 402, a mapping section 403, a received signal processing section 404 and a measurement section 405.

The control section 401 controls the entire user terminal 20. The control section 401 controls at least one of, for example, UL signal generation of the transmission signal generating section 402, UL signal mapping of the mapping section 403, DL signal reception processing of the received signal processing section 404, and measurement of the measurement section 405.

More specifically, the control section 401 may monitor (blind-decode) the DL control channel, and detect DCI for scheduling a data channel for the user terminal 20. The control section 401 may control reception of the DL data channel based on the DCI. Furthermore, the control section 401 may control transmission of a UL data channel based on the DCI.

The control section 401 may decide a blank resource area (blank resource pattern) configured in association with a given Bandwidth part (BWP). The control section 401 may control transmission and/or reception processing by taking the blank resource area into account.

The control section 401 may decide a blank resource area of an active BWP based on configuration information of the active BWP. The control section 401 may assume that the blank resource area of the active BWP is included in a blank resource area that is common between a plurality of BWPs. In addition, the common blank resource area may include a resource area outside a frequency band of the active BWP.

The control section 401 may decide the blank resource area assuming one of followings (1) to (3): (1) An entire bandwidth of a given BWP (e.g., active BWP) is a blank resource area in a given period; (2) Part of the bandwidth of the given BWP is the blank resource area in the given period; and (3) The given BWP does not include the blank resource area in the given period.

The control section 401 can be composed of a controller, a control circuit or a control apparatus described based on the common knowledge in the technical field according to the present invention.

The transmission signal generating section 402 generates (e.g., encodes, rate-matches, punctures and modulates) retransmission control information of the UL signal and the DL signal based on an instruction from the control section 401, and outputs the retransmission control information to the mapping section 403. The transmission signal generating section 402 can be composed of a signal generator, a signal generating circuit or a signal generating apparatus described based on the common knowledge in the technical field according to the present invention.

The mapping section 403 maps the retransmission control information of the UL signal and the DL signal generated by the transmission signal generating section 402, on a radio resource based on the instruction from the control section 401, and outputs the retransmission control information to each transmission/reception section 203. For example, the mapping section 403 maps the reference signal on a given radio resource by using an arrangement pattern determined by the control section 401.

The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the DL signal. For example, the received signal processing section 404 may demodulate a DL data channel by using the reference signal of the arrangement pattern determined by the control section 401.

Furthermore, the received signal processing section 404 may output the received signal and/or the signal after reception processing to the control section 401 and/or the measurement section 405. The received signal processing section 404 outputs, for example, higher layer control information of higher layer signaling and L1/L2 control information (e.g., a UL grant and/or a DL assignment) to the control section 401.

The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The measurement section 405 measures a channel state based on a reference signal (e.g., CSI-RS) from the radio base station 10, and outputs a measurement result to the control section 401. In addition, the channel state may be measured per CC.

The measurement section 405 can be composed of a signal processor, a signal processing circuit or a signal processing apparatus, and a measurement instrument, a measurement circuit or a measurement apparatus described based on the common knowledge in the technical field according to the present invention.

(Hardware Configuration)

In addition, the block diagrams used to describe the above embodiments illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 13:
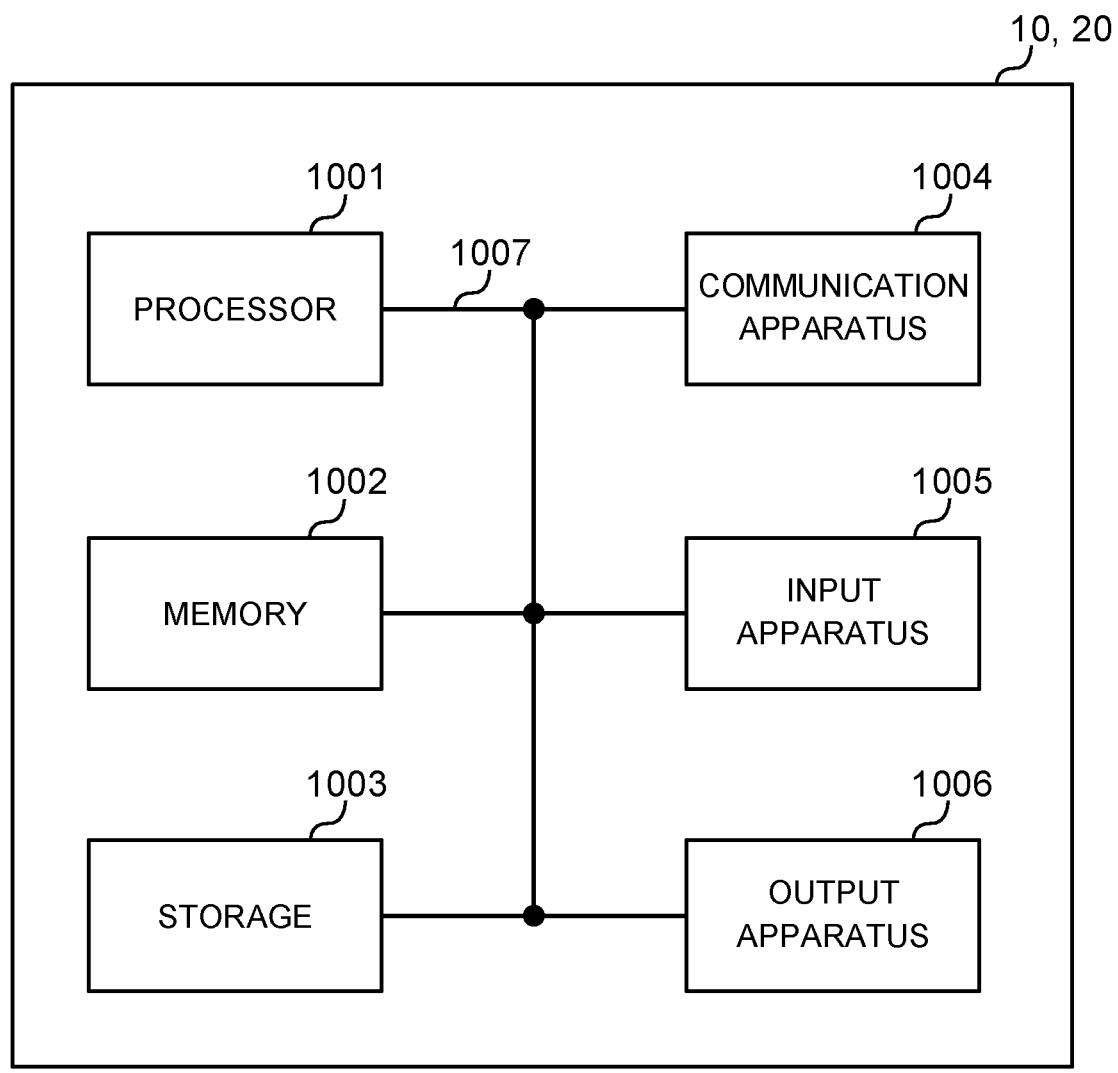
FIG. 13 is a diagram illustrating one example of hardware configurations of the radio base station and the user terminal according to the one embodiment.

For example, the radio base station and the user terminal according to one embodiment of the present invention may function as computers that perform processing of the radio communication method according to the present invention. FIG. 13 is a diagram illustrating one example of the hardware configurations of the radio base station and the user terminal according to the one embodiment. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 13 or may be configured without including part of the apparatuses.

For example, FIG. 13 illustrates the only one processor 1001. However, there may be a plurality of processors. Furthermore, processing may be executed by one processor or may be executed by one or more processors concurrently, successively or by using another method. In addition, the processor 1001 may be implemented by one or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiments are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EE-PROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 and the memory 1002 is connected by the bus 1007 that communicates information. The bus 1007 may be composed by using a single bus or may be composed by using buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of periods (frames) in a time area. Each of one or a plurality of periods (frames) that composes a radio frame may be referred to as a subframe. Furthermore, the subframe may include one or a plurality of slots in the time area. The subframe may be a fixed time duration (e.g., one ms) that does not depend on the numerologies.

Furthermore, the slot may include one or a plurality of symbols (Orthogonal Frequency Division Multiplexing (OFDM) symbols or Single Carrier Frequency Division Multiple Access (SC-FDMA) symbols) in the time area. Furthermore, the slot may be a time unit based on the numerologies. Furthermore, the slot may include a plurality of mini slots. Each mini slot may include one or a plurality of symbols in the time area. Furthermore, the mini slot may be referred to as a sub slot.

The radio frame, the subframe, the slot, the mini slot and the symbol each indicate a time unit for transmitting signals. The other corresponding names may be used for the radio frame, the subframe, the slot, the mini slot and the symbol. For example, one subframe may be referred to as a Transmission Time Interval (TTI), a plurality of contiguous subframes may be referred to as TTIs, or one slot or one mini slot may be referred to as a TTI. That is, the subframe and/or the TTI may be a subframe (one ms) according to legacy LTE, may be a period (e.g., 1 to 13 symbols) shorter than one ms or may be a period longer than one ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth and transmission power that can be used by each user terminal) in TTI units to each user terminal. In this regard, a definition of the TTI is not limited to this.

The TTI may be a transmission time unit of a channel-coded data packet (transport block), code block and/or codeword or may be a processing unit of scheduling and/or link adaptation. In addition, when the TTI is given, a time interval (e.g., the number of symbols) in which a transport block, a code block and/or a codeword are actually mapped may be shorter than the TTI.

In addition, when one slot or one mini slot is referred to as a TTI, one or more TTIs (i.e., one or more slots or one or more mini slots) may be a minimum time unit of scheduling. Furthermore, the number of slots (the number of mini slots) that compose a minimum time unit of the scheduling may be controlled.

The TTI having the time duration of one ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding one ms, and the short TTI (e.g., the reduced TTI) may be read as a TTI having a TTI length less than the TTI length of the long TTI and equal to or more than one ms.

Resource Blocks (RBs) are resource allocation units of the time area and the frequency area, and may include one or a plurality of contiguous subcarriers in the frequency area. Furthermore, the RB may include one or a plurality of symbols in the time area or may have the length of one slot, one mini slot, one subframe or one TTI. One TTI or one subframe may be each composed of one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may be composed of one or a plurality of Resource Elements (REs). For example, one RE may be a radio resource area of one subcarrier and one symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are by no means restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are by no means restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The input and output information and signals can be overwritten, updated or additionally written. The output information and signals may be deleted. The input information and signals may be transmitted to other apparatuses.

Notification of information is not limited to the aspects/embodiments described in this description and may be performed by using other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIBs) and System Information Blocks (SIBs)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") may be made not only explicitly but also implicitly (by, for example, not notifying this given information or by notifying another information).

Decision may be made based on a value (0 or 1) expressed by one bit, may be made based on a boolean expressed by true or false or may be made by comparing numerical values (e.g., comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. For example, "connection" may be read as "access".

It can be understood that, when connected in this description, the two elements are "connected" or "coupled" with each other by using one or more electric wires, cables and/or printed electrical connection, and by using electromagnetic energy having wavelengths in radio frequency areas, microwave areas and/or (both of visible and invisible) light areas in some non-restrictive and incomprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiments described in this description. The present invention can be carried out as modified and changed aspects without departing from the gist and the scope of the present invention defined based on the recitation of the claims. Accordingly, the disclosure of this description intends for exemplary explanation, and does not have any restrictive meaning to the present invention.

The invention claimed is:

1. A terminal comprising:
   a receiver that receives at least one of first configuration information about a bandwidth part (BWP)-specific reserved resource and second configuration information about a cell-specific reserved resource; and
   a processor that controls receiving processes for Physical Downlink Shared Channel (PDSCH) under an assumption that the PDSCH is not allocated in a reserved resource corresponding to the at least one of the first configuration information and the second configuration information,
   wherein the reserved resource is at least one of following:
   a whole of a given BWP in a period;
   a part of the given BWP in the period; and
   not included in the given BWP in the period.

2. A radio communication method for a terminal, comprising:
   receiving at least one of first configuration information about a bandwidth part (BWP)-specific reserved resource and second configuration information about a cell-specific reserved resource; and
   controlling receiving processes for Physical Downlink Shared Channel (PDSCH) under an assumption that the PDSCH is not allocated in a reserved resource corresponding to the at least one of the first configuration information and the second configuration information,
   wherein the reserved resource is at least one of following:
   a whole of a given BWP in a period;
   a part of the given BWP in the period; and
   not included in the given BWP in the period.

3. A system comprising:
   a terminal that comprises:
      a receiver that receives at least one of first configuration information about a bandwidth part (BWP)-specific reserved resource and second configuration information about a cell-specific reserved resource; and
      a processor that controls receiving processes for Physical Downlink Shared Channel (PDSCH) under an assumption that the PDSCH is not allocated in a reserved resource corresponding to the at least one of the first configuration information and the second configuration information; and
   a base station that comprises:
      a transmitter that transmits the at least one of the first configuration information and the second configuration information,
   wherein the reserved resource is at least one of following:
   a whole of a given BWP in a period;
   a part of the given BWP in the period; and
   not included in the given BWP in the period.

* * * * *